United States Patent [19]

McDermott

[11] Patent Number: 5,009,406
[45] Date of Patent: Apr. 23, 1991

[54] VEHICLE DOOR REMOVAL APPARATUS

[76] Inventor: Gregory J. McDermott, 4725 Clippert, Dearborn Heights, Mich. 48125

[21] Appl. No.: 461,319

[22] Filed: Jan. 5, 1990

[51] Int. Cl.$^5$ .............................................. B23Q 3/00
[52] U.S. Cl. ..................................................... 269/17
[58] Field of Search ..................... 269/17, 60, 285, 71, 269/286, 130-132, 905, 904; 254/9 R, 9 B, 9 C, 122, 126, 133, 134; 414/11, 10, 589, 590; 72/705

[56] References Cited

U.S. PATENT DOCUMENTS

| | | | |
|---|---|---|---|
| 2,908,403 | 10/1959 | Browder et al. | 269/17 |
| 3,030,103 | 4/1962 | Allen et al. | 269/17 |
| 4,180,252 | 12/1979 | Cushenbery | 269/17 |
| 4,183,511 | 1/1980 | Marek | 269/17 |
| 4,555,100 | 11/1985 | Ditto | 269/285 |
| 4,810,151 | 3/1989 | Shern | 269/17 |

OTHER PUBLICATIONS

"Autobody and Specialty Tools American Made From Steck Manufacturing, Co., Inc.", Steck Manufacturing Co., Inc., 1987 (see p. 7 for door dolly).

Primary Examiner—Robert C. Watson
Attorney, Agent, or Firm—Harness, Dickey & Pierce

[57] ABSTRACT

Disclosed is an apparatus for removing a vehicle door and replacing it by a single operator. The apparatus includes a base having two vertically adjustable supports and a set of casters for moving the apparatus along the floor. The vertically adjustable supports engage the vehicle door at its lower edge to support it. A vertically extending frame rests against one side of the door. The frame is adjustable along the base to accommodate doors of varying widths. A strap holds the door against the frame. Once the vehicle door is secured to the apparatus it can be removed from the vehicle and rolled away. The door is secured in a fixed position on the apparatus, such that it will remain in substantially the same position it was when it was removed from the vehicle, thus, making it easy to connect the door back on the vehicle.

15 Claims, 1 Drawing Sheet

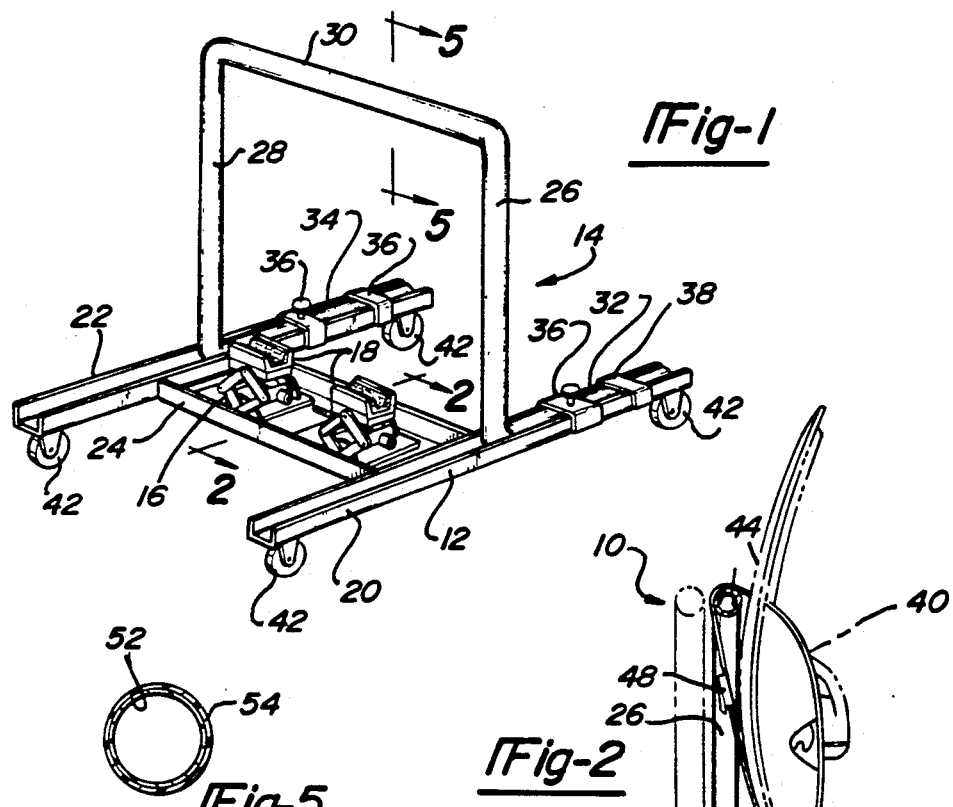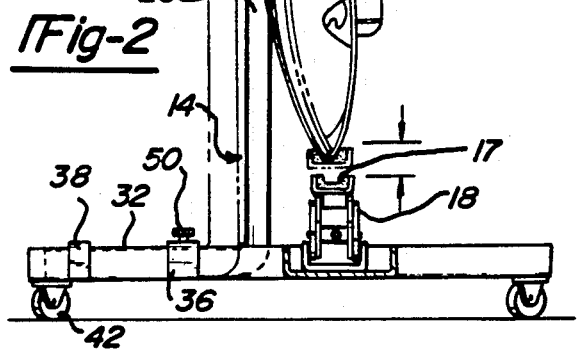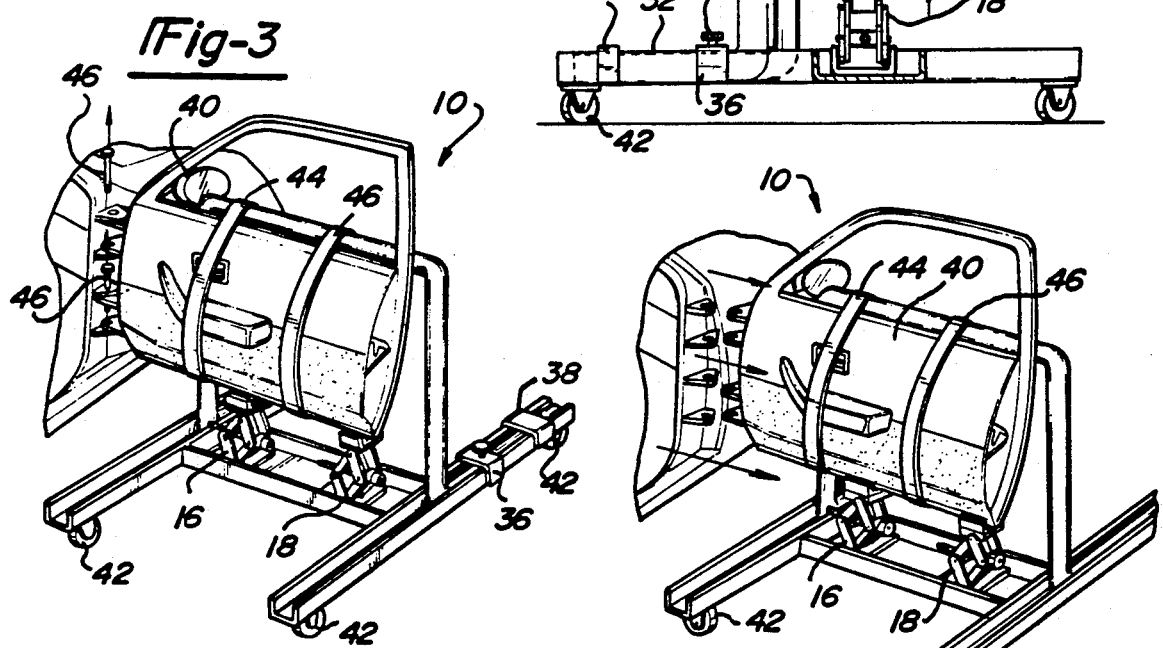

VEHICLE DOOR REMOVAL APPARATUS

BACKGROUND OF THE INVENTION

During repair, maintenance and other body work on a vehicle it is often desirable to remove the vehicle doors from their hinge assemblies. This task has always been problematic in the past in that vehicle doors and the hinges used are not easily removable and replaceable, even with two or more people to assist one another. In the past, this operation has generally required two men in order to remove and replace these doors Even with two workmen the removal and replacement operation was problematic because of man hours utilized in actual alignment and realignment of the doors to make them operable again and also was inefficient since the workers will tend to socialize prior to, during and after completion of the job.

In the past vehicle doors were only removed when absolutely necessary. Because of this, maintenance on vehicle doors, such as removal and replacement of bushings, goes unchecked for the life of the automobile causing loose hinge fittings, rattling and the like. While these bushings could and should be replaced, owners are not likely to do the replacement because the cost is excessive. Also, body shops are adverse to performing the job because of the work hours and general hassle involved.

Therefore, there has been a need in the art to provide a mechanism which would assist a body shop worker in removing and realigning the doors to reduce the problematic nature of the operation.

Therefore, it is an object of the present invention to provide a vehicle door removal apparatus which allows one man removal and realignment of a vehicle door in a simple operation.

SUMMARY OF THE INVENTION

In accordance with the above goal and objective, an apparatus for vehicle door removal and replacement by a single individual operator is provided in the present invention. The apparatus of the present invention includes a base portion including a pair of parallel channel members connected by a central cross member. A pair of vertically adjustable supports are spaced along the length of the cross member. These adjustable supports engage a lower edge of an opened vehicle door for vertically supporting the door when removed from the vehicle A vertically extending frame member extends from the base portion and is selectively adjustable horizontally along the base portion for accommodating different widths of vehicle doors to be removed. A strapping assembly is provided which secures the vehicle door to the frame member when the apparatus is in position. In the operative position the door is supported vertically by the vertically adjustable supports and the frame member and securing assembly hold the door in its vertically oriented position. When supported in this manner the hinge pins and hinges of the door may be readily removed for separating the hinges at the vehicle door from the vehicle. Thereafter, the vehicle door may be serviced or worked on, while secured on the apparatus of the present invention and thereafter replaced in the exact same orientation in which it was removed from the vehicle, all by a single worker.

Additional benefits and advantages of the present invention will become apparent from the subsequent description of the preferred embodiment and the appended claims taken in conjunction with the accompanying drawings.

BRIEF DESCRIPTION OF THE DRAWINGS

FIG. 1 is a perspective view of the apparatus of the present invention;

FIG. 2 is a cross-sectional view taken along line 2—2 of FIG. 1 showing the apparatus of a present invention and illustrating the engagement of a vehicle door in the opened position, the door is shown in phantom in the drawing;

FIG. 3 is a detailed perspective view showinq the use of the present apparatus and removal of a door from a vehicle;

FIG. 4 is a perspective view similar to FIG. 3 showing the actual removal of the door; and FIG. 5 is a cross-sectional view taken along line 5—5 of FIG. 1 showing the coated vertical support member for protection of the vehicle door during engagement thereof.

DESCRIPTION OF THE PREFERRED EMBODIMENT

According to the present invention there is provided an apparatus 10 for vehicle door removal and replacement. Apparatus 10 includes a base portion 12, a vertically extending frame member 14 and adjustable supports 16 and 18.

The base portion 12 includes parallel channel members 20 and 22 which are connected by a central cross-member 24 for forming an "H" shaped base portion. The frame member 14 includes a pair of vertically extending side bars 26 and 28 which are connected by a central horizontally extending bar 30. The lower peripheral ends of the bars extend in a horizontal direction (along the "Z" axis) to provide horizontal extensions 32 and 34. The horizontal extensions 32 and 34 fit into the central channels of the channel members 20 and 22, are horizontally slideable therein and are restrained in the central channels by sleeves 36 and 38 on the channel members. The sleeves 36 include a clamping screw 50 for locking the horizontal members 32 and 34 after they are adjusted horizontally to the correct position.

The vertically adjustable supports 16 and 18 are preferably a pair of scissor jack stands or the like. The jack stands 16 and 18 include a channel 17 therein which engages the lower flange portion of the door to prevent movement of the door with respect to the jack stands 16 and 18. Preferably, the channel 17 is rubber coated to further discourage movement of the door in the channel and prevent marring of the finished surfaces of the door. The back stands may be raised or lowered and stopped at a number of positions to provide of proper support of the lower edge of the door 40 at both the inboard portion adjacent the hinges of the door and the outboard portion of the door.

The lower frame member includes casters 42 at the peripheral ends of the parallel channel members 20 and 22, for moving the apparatus into position to an open door 40 and for providing motivation to the unit during removal, servicing and reattachment of the door. The casters keep the vehicle door in a fixed vertical position relative to the floor. The casters further provide ease of making minor propositional adjustments to the apparatus when it is near the vehicle door to be removed.

Referring now to FIGS. 2–4, the apparatus 10 must first be moved into position under an open vehicle door 40 wherein the jack stands 16 and 18 may be raised to support the lower surface of the door 40. Thereafter, the clamp screw 50 may be loosened to allow horizontal movement of the vertical frame member 14 into position against the door 40. Thus, as shown in FIG. 2, the frame member may be horizontally moved from an initial position (as shown in phantom) to a position against the door. The frame member is then locked into position by tightening the clamp screws 50 against the horizontal extensions 32 and 34. The frame member is thus adjustable to accommodate varying widths of vehicle doors.

Straps 44 and 46 are provided which include adjustable connection assemblies 48 for securing the door in an upright position against the frame. Conventional adjustable quick connect snap assemblies may be utilized for allowing correction and adjustment of the straps in order to secure the doors to the frame member The strap member securely holds the door in the supported position Thereafter, the hinge pins or other mechanisms holding the door to the vehicle 46 may be removed with adjustment of the jack stands 16 or 18 as necessary. Once the hinge pins are removed the door may be removed as shown in FIG. 4 and either repaired on the spot or may be moved to the side for storage while other vehicle work is being done.

FIG. 5 shows a cross-section of the frame member. The frame member 14 comprises an inner metal tube 52 and an outer coating 54. The outer coating 54 is made of the non-marring protective material for protection of the finished door surface.

It is an important advantage of the present invention in that the door is stored or removed in the exact configuration and position which it was in place on the automobile in the open position. Thus, the stand may merely be moved back into position and the door is pre-aligned for easy attachment to the hinge assemblies on the vehicle. This remedies a major problem in the past in that it was always necessary to realign and readjust the doors after removing them, which was a time consuming and expensive proposition.

While the above description constitutes the preferred embodiment of the present invention, it is to be appreciated that the invention is susceptible to modification, variation and change without departing from the proper scope and fair meaning of the accompanying claims.

What is claimed is:

1. A vehicle door removal and replacement apparatus for allowing removal of a door by a single individual operator comprising:
   a base portion, said base portion comprising a pair of channel members connected by a central cross member;
   an adjustable support connected to said base portion, said adjustable support for engaging a lower edge of an opened vehicle door for vertically supporting the door;
   a vertically extending frame member extending from said base portion, said frame member comprising means to adjust said frame member along said base portion for accommodating different widths of vehicle doors; and
   a means to secure the vehicle door to said frame member, such that the means to secure and the adjustable support hold the door in a fixed position whereby the door may be removed from the vehicle, serviced and replaced in substantially the same orientation as when it was removed.

2. The apparatus according to claim 1 wherein said adjustable support is positioned on said central cross member.

3. The apparatus according to claim 1 wherein said adjustable support comprises a pair of adjustable supports said said pair of adjustable supports are adjustable in a vertical direction.

4. The apparatus according to claim 3 wherein said vertically adjustable supports further comprise jack stands.

5. The apparatus according to claim 1 wherein said vertically extending frame member comprises means to hold said frame member in a selected position.

6. The apparatus according to claim 2 wherein said vertically extending frame member is coated with a protective non-marring material.

7. The apparatus according to claim 2 wherein said means to secure a vehicle door to said frame member further comprises a strapping harness.

8. The apparatus of claim 1 further comprising casters for allowing motivation of said apparatus along a floor surface and keeping the vehicle door in a fixed vertical position relative to the floor during motivation of the apparatus.

9. The apparatus of claim 8 wherein said caster means comprises four casters for allowing motivation of said apparatus and for keeping the vehicle door in a fixed vertical position relative to the floor.

10. A vehicle door removal and replacement apparatus for allowing removal of a door by a single individual operator comprising:
    a base portion, said base portion including a pair of parallel channel members connected by a central cross member;
    caster means positioned at the ends of said channel members;
    a pair of vertically adjustable supports spaced along the length of said cross member, said adjustable supports for engaging a lower edge of an opened vehicle door for vertically supporting the door when removed from the vehicle;
    a vertically extending frame member extending from said base portion, said frame member being selectively adjustable horizontally along said base portion for accommodating for different widths of vehicle doors to be removed; and
    a means to secure a vehicle door to said frame member, wherein said apparatus may be placed in position such that said supports engage an opened vehicle door at the lower end thereof, said frame member being adjustable to engage the vertical side of said door and said means securing the door in this position whereby the door may be removed from the vehicle, serviced and replaced in substantially the same orientation as when it was removed.

11. The apparatus of claim 10 wherein said caster means allows movement of said apparatus along a floor surface such that the vehicle door is kept in a substantially fixed vertical position.

12. The apparatus according to claim 10 wherein said vertically adjustable supports further comprise jack stands.

13. The apparatus according to claim 10 wherein said vertically extending frame member is coated with a protective non-marring material.

14. The apparatus according to claim 10 wherein said means to secure a vehicle door to said frame member further comprises a strapping harness.

15. A vehicle door removal and replacement apparatus for allowing removal of a door by a single individual operator comprising:

a base portion, said base portion comprising a pair of channel members connected by a central cross member;

an adjustable support positioned by said central cross member connected to said base portion, said adjustable support for engaging a lower edge of an opened vehicle door for vertically supporting the door;

a vertically extending frame member extending from said base portion, said frame member comprising means to adjust said frame member along said base portion for accommodating different widths of vehicle doors; and a means to secure the vehicle door to said frame member, such that the means to secure and the adjustable support hold the door in a fixed position whereby the door may be removed from the vehicle, serviced and replaced in substantially the same orientation as when it was removed.

* * * * *